UNITED STATES PATENT OFFICE.

CHARLES BASKERVILLE, OF NEW YORK, N. Y., AND CLARENCE M. JOYCE, OF LEOMINSTER, MASSACHUSETTS.

METHOD OF RECLAIMING PAPER-STOCK.

1,351,092.     Specification of Letters Patent.     Patented Aug. 31, 1920.

No Drawing.     Application filed October 7, 1919. Serial No. 328,982.

*To all whom it may concern:*

Be it known that we, CHARLES BASKERVILLE and CLARENCE M. JOYCE, citizens of the United States, and residents of the borough of Manhattan, city of New York, county and State of New York, and Leominster, county of Worcester, and State of Massachusetts, respectively, have made certain new and useful Improvements in Methods of Reclaiming Paper-Stock, of which the following is a specification.

Our invention relates to the reclaiming of waste paper and book stock such as old newspapers, magazines, etc., which offer a large source of paper pulp, provided the stock be sufficiently de-inked with minimum injury to the fiber.

Various processes, either mechanical or chemical in nature, or both, have been proposed, some of which are in actual use to a limited extent, but when tried out on a commercial scale, fail to give the superior pulp desired. The failure of these processes is due to the fact that in some instances the stock is pulped mechanically and in so doing the ink pigments are driven more thoroughly into the fibers, necessitating drastic mechanical treatment for separation which not only shortens the fibers of the stock but also weakens the same. In other instances the stock is treated with a caustic soda solution but while most of the ink may be removed, the fiber of the stock is very much weakened and yellowed due to the action of the solution. A strong bleaching treatment does not wholly discharge this yellow color and at the same time has a further harmful action on the fiber.

A solvent, for example kerosene, will tend to loosen the ink binder and this action may be accelerated if desired, by a suitable alkali which tends to saponify one or more of the binding constituents. Caustic alkalis or soda bring about this saponification most satisfactorily but at the same time especially at elevated temperatures, a certain amount of mercerization of the fiber is produced, destroying the texture of the fiber and producing an undesirable yellowing. If a salt, which on solution in water is mildly alkaline, a water solution of borax for example, be added to the solvent mentioned above, in place of the caustic alkali or soda, the ink binder may readily be loosened from the stock and the carbon washed away without deleteriously affecting the stock being treated. As a matter of fact, a soap solution in water alone tends to wash the ink away but its detergent action calls for scouring or rubbing which may embed some of the carbon particles of the ink in the fiber so thoroughly as to make it almost impossible to separate the two.

By combining a solvent such as kerosene, a water solution of borax and a soap solution in one mixture, the ink may readily be lifted from sulfite or soda paper and readily washed away, the soap solution if agitated forming a suds or a skim upon the surface of the mixture to entangle the carbon particles of the ink and causing the same to float upon the surface.

In the manufacture of some papers certain substances, for example rosin, are used in part as fillers and binders for the fibers of the paper; furthermore, certain printing papers, especially newspaper, contain quantities of admixed ground wood which retain natural gums and resins, and the ink pigments are bound to the paper by these agencies, as well as by the ink vehicles. While in many instances these resins and gums are thoroughly loosened by a mixture such as outlined above, we have obtained excellent results by adding to such a mixture a solvent, such as pine oil, for the gums and resins mentioned.

While the removal of the ink from the stock will take place at ordinary temperatures, the detergent action and suds formation are accentuated and accelerated by heat and therefore we prefer to raise the temperature of the mixture by live steam, keeping the temperature of the mixture, however, below that of boiling water, thereby reducing the tendering, shortening and yellowing of the fiber to a minimum.

In practising our process the stock being reclaimed is preferably torn up sufficiently to remove metallic particles such as binding wire, etc., is then dusted and finally thrown into a mixture of kerosene or equivalent solvent, borax, soap and water where the pieces of the stock are soaked and gradually pulled apart by a slow movement which may be brought about by any suitable mechanical device.

We have found that a mixture best suited for treatment of 2000 lbs. of book stock is made up substantially as follows:

10 lbs. borax,
10 lbs. soap,
2 gal. kerosene,
2 gal. pine oil,
3000 gal. water.

As soon as the movement of the fluid mass is well under way, we preferably raise the temperature thereof to from 170° to 190° F. by the use of steam.

Should the process be carried on in a beater, the rollers are lifted off the bed-plate for two hours, the washing cylinders are then lowered and the washing continued for two hours. Of course the time factor in each step is dependent on the character of the stock used and the final stock desired. Should bleaching be necessary as a final step, as in the event of the original stock being very dirty or heavily colored by ink, this may be done by treating the recovered pulp with chlorid of lime in water and subsequently washing.

By our process a superior product is obtained from waste material in that a whiter and longer fiber pulp is obtained and less new sulphite pulp goes into a finished sheet of required strength and whiteness than in any process heretofore known to us.

It is to be understood that we are not to be limited to the exact proportions of the ingredients of the mixture disclosed above, nor to the specific ingredients mentioned as obviously these may be varied by others skilled in the art within the purview of the present invention.

What we claim as new is:

1. The method of reclaiming inked paper which consists in saturating the paper in a mixture composed of kerosene, borax, soap and water.

2. The method of reclaiming inked paper which consists in saturating the paper in a mixture composed of kerosene, borax, soap, water and pine oil.

3. The method of reclaiming inked paper which consists in saturating the paper in a mixture composed of kerosene, borax, soap, pine oil and water in the proportions substantially of two (2) gallons of kerosene, ten (10) pounds of borax, ten (10) pounds of soap, two (2) gallons of pine oil and three thousand (3000) gallons of water.

4. The method of reclaiming inked paper which consists in dividing the paper into small portions, saturating the paper in a mixture composed of kerosene, borax, soap, water and pine oil, heating and agitating the mass to cause the carbon particles of the ink to be loosened from the fibers of the paper and become entrained in the suds of the mixture due to the heating and agitating of the mass.

CHARLES BASKERVILLE.
CLARENCE M. JOYCE.